United States Patent [19]
Smith

[11] Patent Number: 5,388,155
[45] Date of Patent: Feb. 7, 1995

[54] CORDLESS PHONE HOLDER ENABLING HANDS FREE USE

[76] Inventor: William G. Smith, 387 Waccamaw Shores Rd., Lake Waccamaw, N.C. 28450

[21] Appl. No.: 927,074

[22] Filed: Aug. 7, 1992

[51] Int. Cl.⁶ .......................................... H04M 1/00
[52] U.S. Cl. ................................. 379/446; 379/455; 379/426; 379/449
[58] Field of Search .............. 379/442, 430, 433, 449, 379/455, 426, 446; 455/89, 90

[56] References Cited

U.S. PATENT DOCUMENTS

| 4,558,178 | 12/1985 | Yasuda et al. | 379/430 |
| 5,201,003 | 4/1993 | Pavel | 379/438 |
| 5,282,246 | 1/1994 | Yang | 379/446 |

FOREIGN PATENT DOCUMENTS 348187A 12/1989 European Pat. Off. ............ 379/437

Primary Examiner—James L. Dwyer
Assistant Examiner—Jack Chiang
Attorney, Agent, or Firm—Michael E. Mauney

[57] ABSTRACT

Disclosed is a case for a handset of a cordless phone which adapts the cordless phone handset for hands free use. The case is open on one side to receive the cordless handset which is then secured into place by foldable flaps at each end of the case. A microphone is within the flap next to the earpiece of the cordless handset and a speaker is within the flap next to the mouthpiece. The microphone and speaker are wired to a telephone headset. The case is secured to the body of the user and the headset positioned on the head of the user. When the cordless handset is activated, the user utilizes the headset for hand's free use of the cordless phone. The user may move about freely within the range of the cordless phone with both hands free for other tasks.

16 Claims, 6 Drawing Sheets

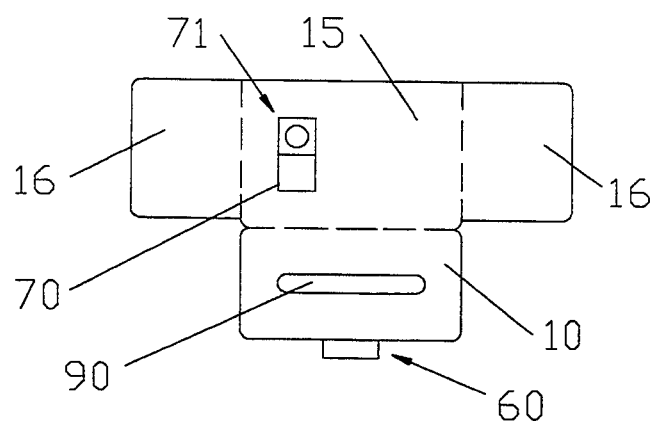
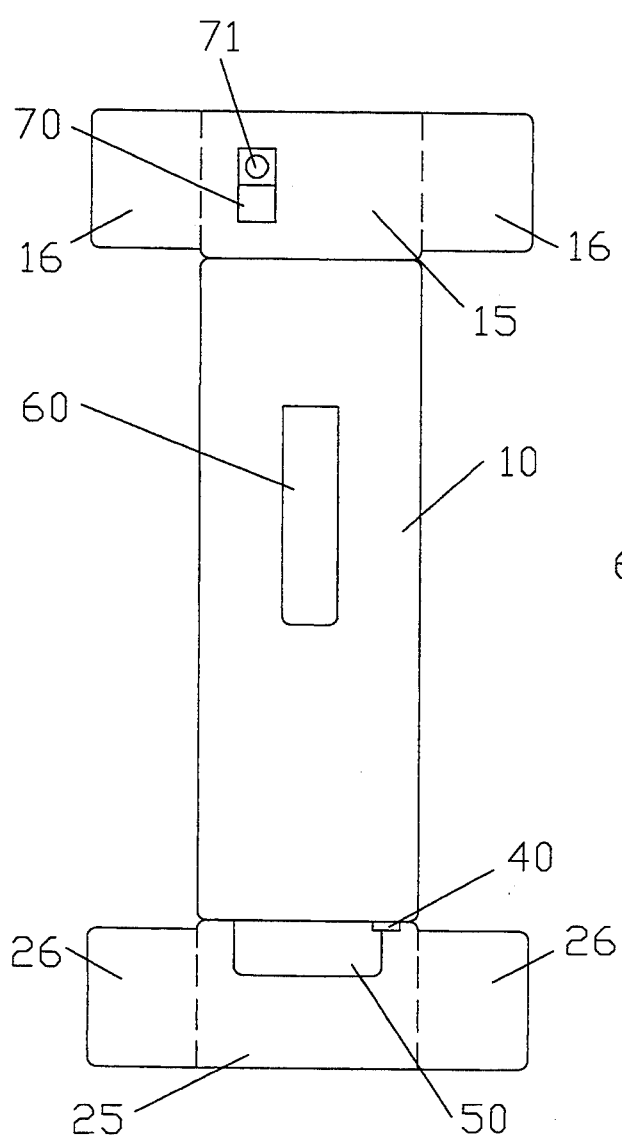
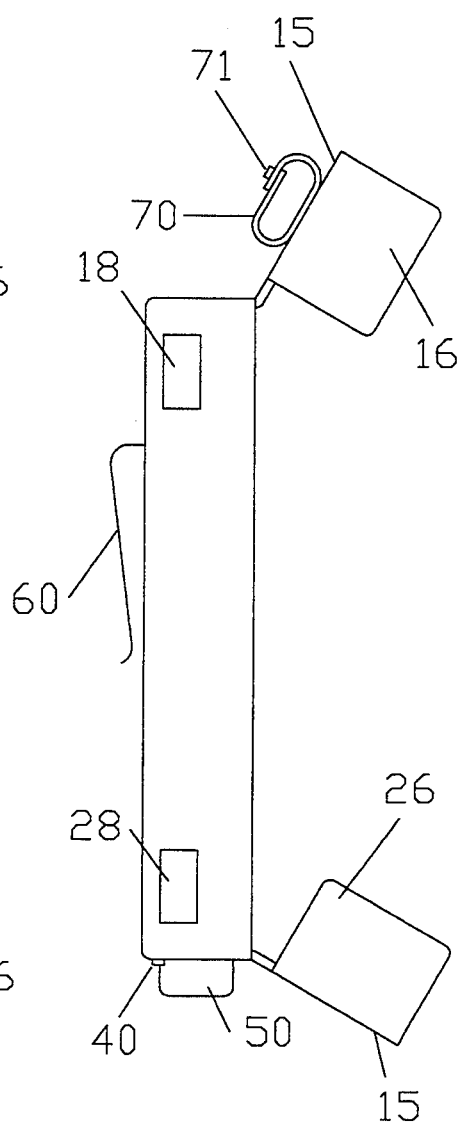
FIG. 3
FIG. 4
FIG. 2

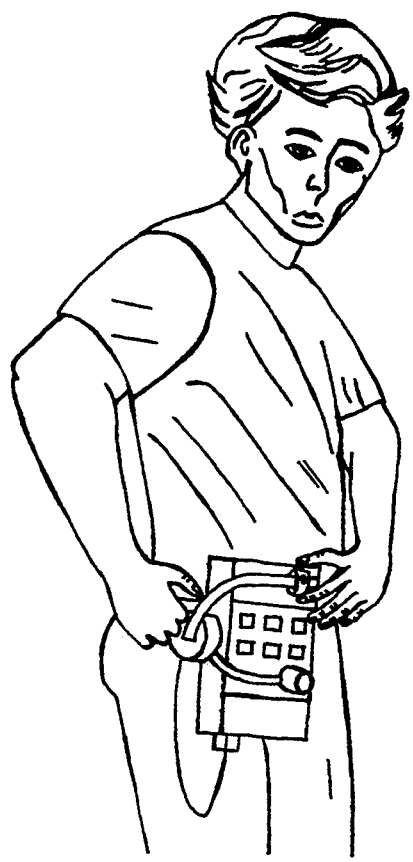
FIG. 8
FIG. 9
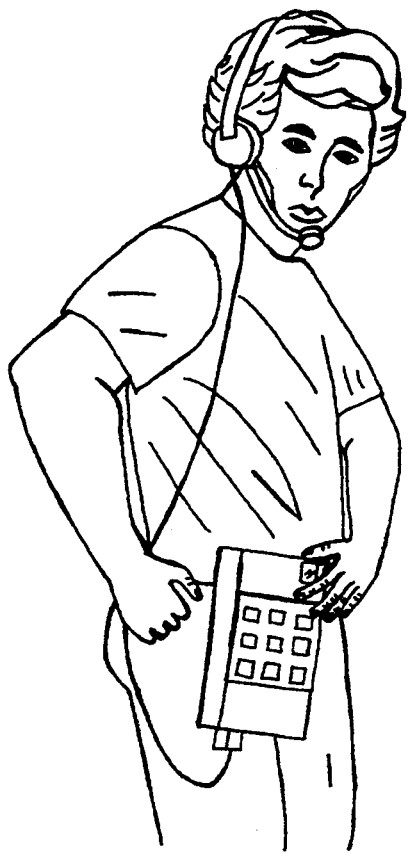

CORDLESS PHONE HOLDER ENABLING HANDS FREE USE

BACKGROUND AND SUMMARY OF THE INVENTION

The telephone is an essential means of communication both in business and in homes. For generations a standard telephone consisted of a handset connected by a cord to a base dialing unit, which was then attached by a cord to a wall connection to the telephone network. However, in recent years there have been advances in telephones which have increased not only the scope of their use but also the convenience of their use. Among these advances are communication of documents by facsimile transmission, mobile cellular phones, speaker phones and cordless phones. Facsimile machines and cellular phones are largely confined to business use. However, cordless phones are a widely popular consumer item and may be found in most homes and many small businesses.

Cordless phones come in a variety of configurations and features. However, they almost all have in common main station which is connected by cord to a wall connection to the telephone network. There is a handset which communicates with the main station, and hence through the telephone network, by means of a radio transmitter. The handset may be used anywhere within the range of its radio transmitter. Thus, one may use the handset of the cordless phone without one's mobility being limited by the length of a connecting cord. The handsets of most cordless phones have an oblong shape and are approximately the same size. They are equipped with a telescoping antenna at the earpiece end of the handset, and with a dialing means centered in the handset between the earpiece and the mouthpiece.

This invention relates to a device adopted to be used with most handsets for a cordless phones, which would allow for hands free operation of the handset by use of a telephone headset. The invention comprises a housing, open on one side, of an appropriate oblong size and shape for receipt of a handset of a cordless phone. The housing can be constructed from some durable, slightly elastic material or it could also be constructed of a rigid material, lined with padding, foam or other materials conformable to different sized and shaped handsets. At the earpiece end of the housing there is a foldable flap which extends across and over the earpiece of the handset of the cordless phone and which is detachably secured to the side of the housing. Within this flap is a microphone positioned to receive the sound transmissions coming through the earpiece of the cordless phone. This flap performs the dual purpose of securing the handset within the housing and positioning the microphone for receiving the sound signals being broadcast by the earpiece of the cordless phone. At the opposite end of the housing is a second flap which also folds over and is detachably secured to the sides of the housing. Within this flap, there is a small speaker positioned to transmit sounds to the mouthpiece of the cordless phone. This flap also performs a dual purpose of securing the cordless handset in place and positioning a speaker for transmission of sound signals into the mouthpiece of the cordless phone handset. The speaker and microphone in the respective flaps are wired to a four wire telephone jack which may be used with most phone headsets. The microphone and speaker are powered by a replaceable battery. The cordless phone handset is placed in the housing and the flaps at each end of the housing are folded and attached to the housing. The housing then may be attached to the body of its user, by a clip or a belt loop, which would attach to the clothing or belt already in place on the body of the user, or it could be separately attached by other means including a belt dedicated to use with the housing. A phone headset is connected to the jack and attached to the housing at a convenient place.

A user of this invention would use it by taking his already owned handset for his cordless phone, placing it in the housing, attaching each flap in place, then securing the housing and headset somewhere on his person by means of a clip or belt. The user could go about his everyday business with both hands free for whatever task might be required. Should the phone ring or should the user decide to make a call, the user would take the headset from it's attachment on the housing, placing it on his head, turn the cordless phone handset switch to the ON position, then use the phone. The only use of the hands would be to place the headset in place and to activate the cordless handset. Thereafter during the duration of the conversation, which could last for a few seconds or many minutes, the user's hands would be free for whatever tasks might be necessary. The utility of this invention for mothers with babies, craftsmen, cooks, physically handicapped or others is limited only by one's imagination. At the end of the conversation the headset is returned to it's storage position and the cordless phone handset is turned off.

The utility of a no-hands use of a phone has long been recognized and has been met by a variety of commercially available items. Among these are speaker phones and headsets previously mentioned. However, the usefulness of speaker phones is limited by their lack of privacy, by interference from outside noise, and by limited range. Commercially available headsets typically must be used with corded phones and their range is limited by the cord length. Known to this inventor is one device for portable use of a cordless phone. Huntley, U.S. Pat. No. 4,802,211, describes a metal brace or holder which sits on the shoulder of the user adjacent to the ear and mouth of the user and is secured in place by braces and cords. This device does permit handless use of a cordless phone but is unwieldy, cumbersome and possibly even dangerous to the user, when compared to the present invention. The Huntley invention is worn continually in place, forcing it's user to be encumbered with metal rods and pieces in proximity to his or her face. When in use the head of the user must be held in one position dictated by the position of the Huntley invention. However, this invention is out of the way when not in use, and when in use permits much greater freedom of head movement.

It is the object of this invention to provide a simple and convenient means of adopting a common cordless phone handset to no-hands use. When the owner of this invention is not using it, it may be readily, conveniently and unobtrusively carried on the person of the user by a belt or attachment to the clothing of the user. When one desires to receive or make a call only one or two movements are necessary for hands free phone operation. This invention provides the same degree of privacy that a standard phone headset does and may be used in any environment in which a standard phone headset would also operate.

BRIEF DESCRIPTION OF THE DRAWING

The objects and features of the invention will become more apparent from the following description and drawings wherein:

FIG. 2 is a side view of the housing;

FIG. 3 is a top view of the housing;

FIG. 4 is a rear view of the housing;

FIG. 8 is a view of the housing on the person of a user before being placed into operation;

FIG. 9 is a view of the housing and telephone headset on the person of the user and in operation.

DETAILED DISCUSSION OF THE DRAWINGS AND PREFERRED EMBODIMENT

FIGS. 1-9 depict the preferred embodiment of this invention. But one skilled in the art will recognize that alternative methods, materials and styles may be employed without departing from the essential underlying inventive principle.

Figure 1:
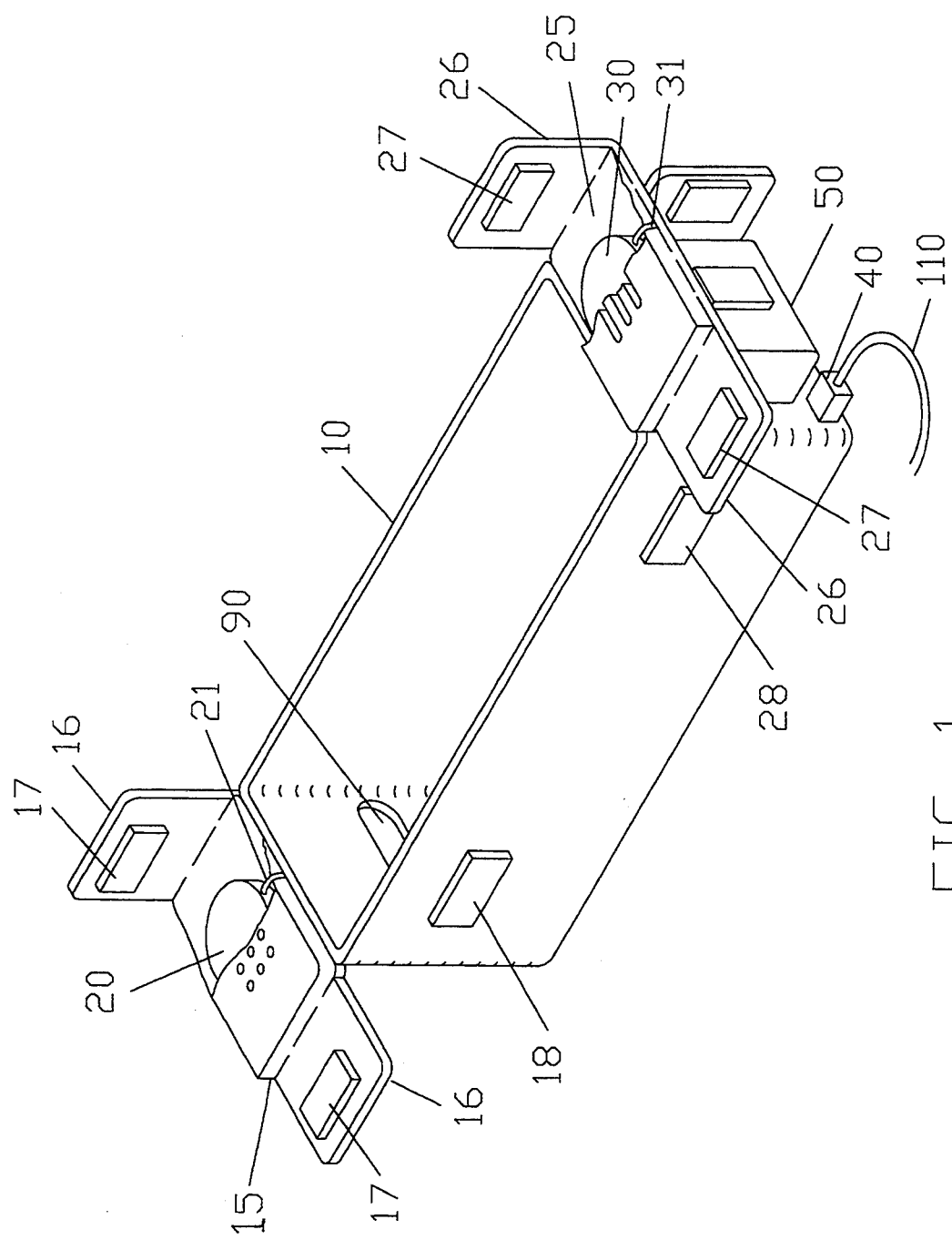
FIG. 1 is a perspective view of the housing in an open position without a cordless phone handset in place within the housing.

FIG. 1 shows a housing 10 open on one side and of suitable size and shape for receipt of a cordless phone handset. The housing may be constructed of any material suitable for use in small pieces of luggage or carrying cases. Among other suitable materials would be a tightly woven linen or cotton canvas material or similar flexible synthetic materials. Flexible materials are more likely to be employed for consumer use where light weight and convenience are primary considerations. The housing could also be constructed of rigid materials. When a rigid material is employed the interior of the housing would necessarily be lined with woven or padded material which would cushion the handset of the cordless phone and also provide some variation in the size of the interior of the housing so as to more readily adopt to the small variations found among the handsets of a cordless phone. A polished wooden housing material might be used where a traditional appearance was desired. A rigid plastic or even a metal housing material might be employed in a commercial application where strength and durability are primary considerations.

Figure 6:
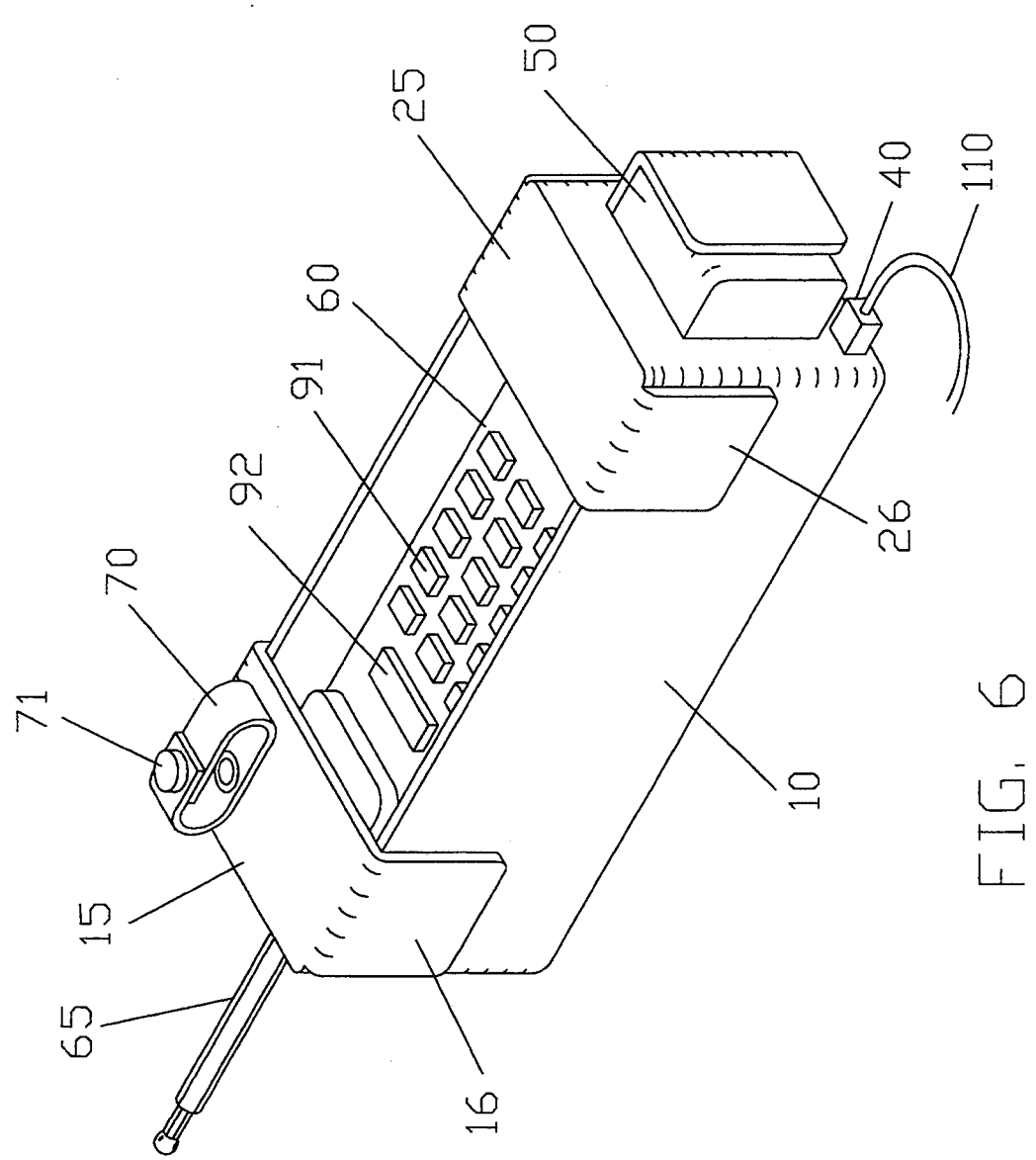
FIG. 6 is a perspective view of the housing with a cordless phone handset in position and with the housing in a closed position.

Shown at the upper end of the housing is a flexible flap 15 which is permanently attached to the upper end of the housing. The flap is shown in an open and extended position. The flap is constructed of a flexible material with elastic properties. The flap could be constructed of an elastic material like rubber or plastic or it could be constructed of an inelastic material but with added elements of an elastic material like plastic or rubber. The elastic property of the flap allows it, when folded down into place as shown in FIG. 6, to stretch so as to closely conform to the shape of the cordless handset now nesting in the housing. The elastic property of the flap also allows it to adopt to the minor variations in size and shape which are found in different handsets of the cordless phone. One feature of the flap are extensions or wings 16 extending outward from the central area of the flap. These wings are equipped with a means 17 for being detachably fixed to the sides of the housing at opposite points on the housing. The means could consist of snaps, buttons, zippers or miniature hook&eye attachments (commercially known by the trade name "VELCRO"). It is desirable that the attachment means allow the wings of the flap to readily attach and detach from the side 18 of the housing itself. The flap at the upper end of the housing is equipped with a microphone 20 for receiving the sound broadcast by the earpiece from the cordless phone handset. A portion of the upper flap 15 is cut away to show the microphone 20 in more detail. In ordinary use the microphone will be positioned underneath the material of the flap 15 so that neither it nor its wiring 21 would be visible. At the upper end of the housing is a slot 90 for the antenna of the cordless phone handset. It is anticipated that a foldable flap with wing extensions is the best mode of practicing this invention. However, the functions served by the foldable flap and wings can be accomplished in other ways.

It may be readily appreciated that attachment of the wings of the flaps to the housing is symmetrical. Thus the points of attachment to the housings shown as in FIG. 1 as 18 and 28 are duplicated on the unshown side of the housing. Thus both the left and right wings of the upper and lower flaps have attachment areas on the upper and lower sides of the housing. The preferred embodiment uses a miniature hook and eye attachment means for attaching and detaching the flaps. This attachment means allows for wider variation in the point of attachment than would a snap, button or zipper attachment means. The more variation allowed in the point of attachment increases the degree of acceptable variation in the size and shape of the cordless handset which may be used in the invention.

Shown at the opposite end of the housing is a second flap 25 permanently attached to the lower end of the housing. It is similar both in function and construction to the flap at the upper end. It may also be constructed of a suitable material with elastic properties and with wings 26 having means 27 for attaching and detaching the wings from opposite sides of the housing 28. The lower flap is equipped with a speaker 30 to transmit the sound signals from the headset to the speaker which then transmits it by reason of close proximity into the mouthpiece of the cordless phone handset. As with the upper flap a portion of the lower flap 25 material is shown cut away so as to show the speaker 30 and its wiring 31 more clearly.

The microphone and speaker are wired in a conventional manner to a four wire telephone jack 40. This telephone jack is used to connect the speaker and microphone to a telephone headset. Such headsets are widely available in electronics stores. It is anticipated that the invention may be sold equipped with or without a headset so that buyers who already possess a telephone headset need not purchase one when purchasing this invention. Power for operation of the microphone, speaker and headset is supplied by a replaceable battery which is secured in a battery compartment 50 which is most conveniently located at the lower end of the housing. The electronic components including the microphone, speaker, wiring, jack and battery are all of conventional construction and are well known to anyone skilled in this art.

FIG. 2 is a side view of FIG. 1. This figure more clearly illustrates the battery compartment 50 and jack 40 located at the lower end of the housing. It also illustrates a belt clip 60 or loop mounted on the bottom side of the housing and adopted for use either with a dedicated belt or for attachment to a belt or clothing of the user. If a separate dedicated belt is supplied with the housing then a wider variety of means of carrying the housing become available. The dedicated belt could go over the shoulder or around the neck of the user so that the housing could be carried along the side of the user with the housing located underneath the arm or even along the back of the user. Also shown in FIG. 2 along the outside of the upper flap 15 is a loop 70 equipped with a snap 71. This loop is used to secure the headset and cord to the housing when they are not in use.

FIG. 3 is a top view of the housing. This shows a different perspective of the upper flap 10 and shows the antenna slot 90 positioned in the top of the housing. Standard cordless phone handsets usually come equipped with an antenna for transmission and receipt of the radio signals to and from the base unit. The housing must make provision for this antenna because many circumstances require the antenna be extended for proper transmission and reception between the handset and base unit.

FIG. 4 is FIG. 1 seen from a rear perspective. This further illustrates the belt clip 60, the battery case 50 and the jack 40. It also illustrates the loop 70 located on the outside of the upper flap 15. This loop is permanently attached to the upper flap and is equipped with snap 71 so as to attachably separate the loop into two pieces. This loop and snap provide a convenient means of securing the headset and cord to the housing when not in use on the head of the user. In the preferred embodiment, the loop is constructed of a durable fabric. The fabric loop is permanently attached to the upper flap. At the end of the the fabric loop is a snap attachment so that the loop may be snapped open and closed. When not in use the cord of the headset is coiled and the headset and coiled cord are placed within the two ends of the fabric loop and then the two ends are snapped closed thus securing the headset and its cord to the upper flap. When it is desired to use the headset the snap is opened separating the loop into two pieces thus freeing the cord and headset for use. The two pieces of the fabric loop could also be detachably connected by a button or miniature hook &eye means (commercially available under the trade name "VELCRO") It is readily apparent that the means of detachably connecting the two ends the loop is not important so long as the two ends are conveniently and readily detachably connected so as to facilitate the storage of the headset and its cord when not in use and retrieval of the headset and cord when their use is required. Attachment means other than a fabric loop of attaching and securing the headset and its cord could also serve. Other such means could include plastic or metal clips, a miniature belt, a hanger loop or the like.

Figure 5:
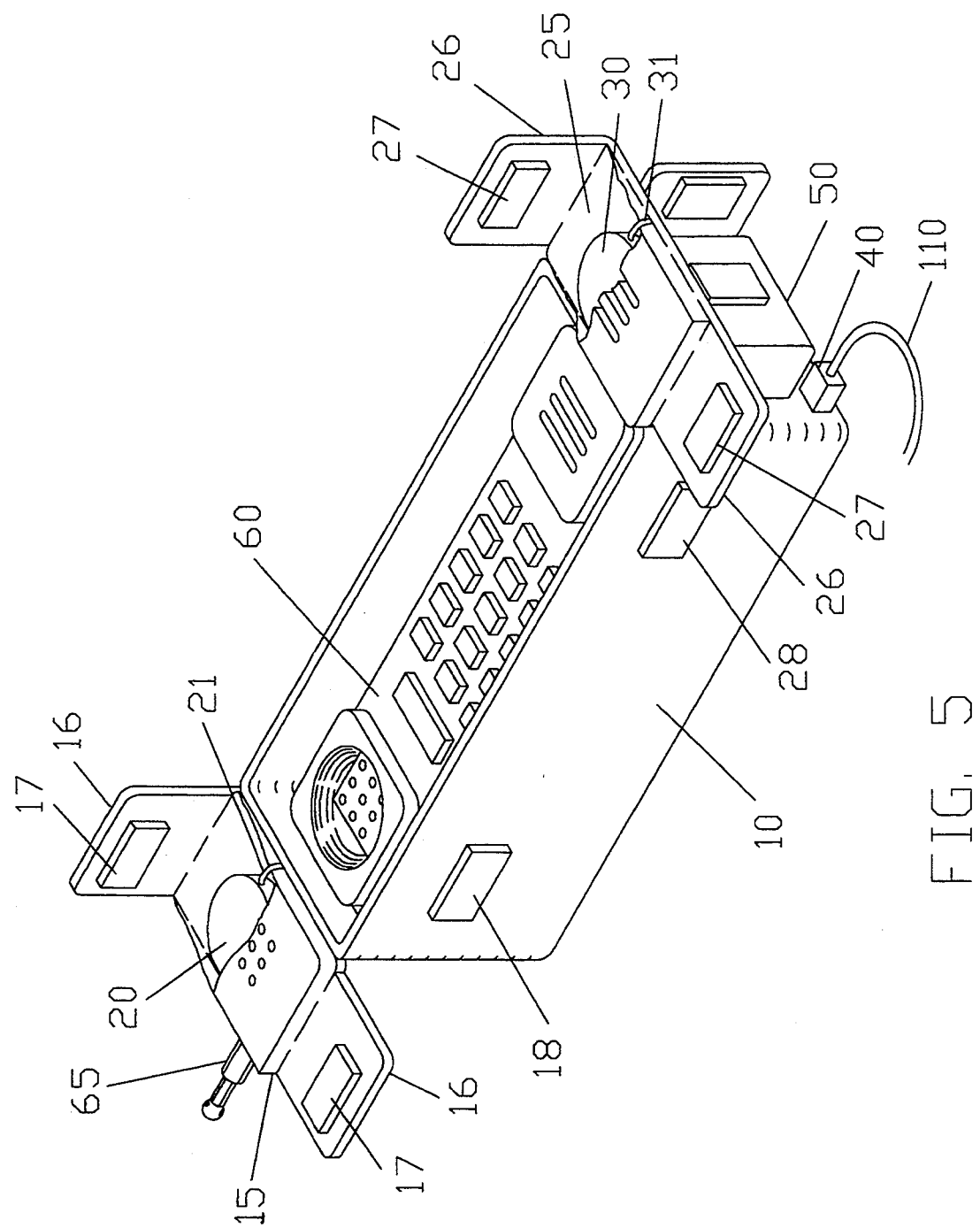
FIG. 5 is a perspective view of the housing in an open position with a cordless phone handset in position within the housing.

FIG. 5 is FIG. 1 with the additional feature added of a cordless phone handset 60 being placed within the open side of the housing and resting in place and in preparation for securing the cordless phone handset in place by means of the two flaps 15 and 25 and their wings 16 and 26. Also shown is the cordless phone handset antenna 65 in a slightly extended position.

FIG. 6 is FIG. 5 but the flaps 15 and 25 have now been folded into place with the wings 16 and 26 folded down and attached along the side of the housing thus securing the cordless phone handset into place. This also places the microphone in flap 15 in proximity to the earpiece of the cordless phone headset so as to receive and transmit the sound signals broadcast by the earpiece of the cordless handset through the wiring to the earpiece of the headset. Likewise the speaker in flap 25 is secured in proximity to the mouthpiece of the cordless phone handset so as to broadcast the sound signals picked up by the microphone positioned in the mouthpiece of the cordless phone headset. The speaker sounds will be received by the mouthpiece of the cordless phone handset and rebroadcast to the base unit and then to the receiver at the other end of the phone connection.

FIG. 6 also shows the attachment loop 70 positioned on the outside of the upper flap which is used for attachment and storage of the headset and its cord when not in use. In the usual cordless phone handset the dialing means 91 and control switches 92 are located in the center of the handset facing in the same orientation as the earpiece and mouthpiece. As shown in FIG. 6 the dialing means and central switches of the cordless phone handset are exposed and readily accessible to the user for ease of operation.

Figure 7:
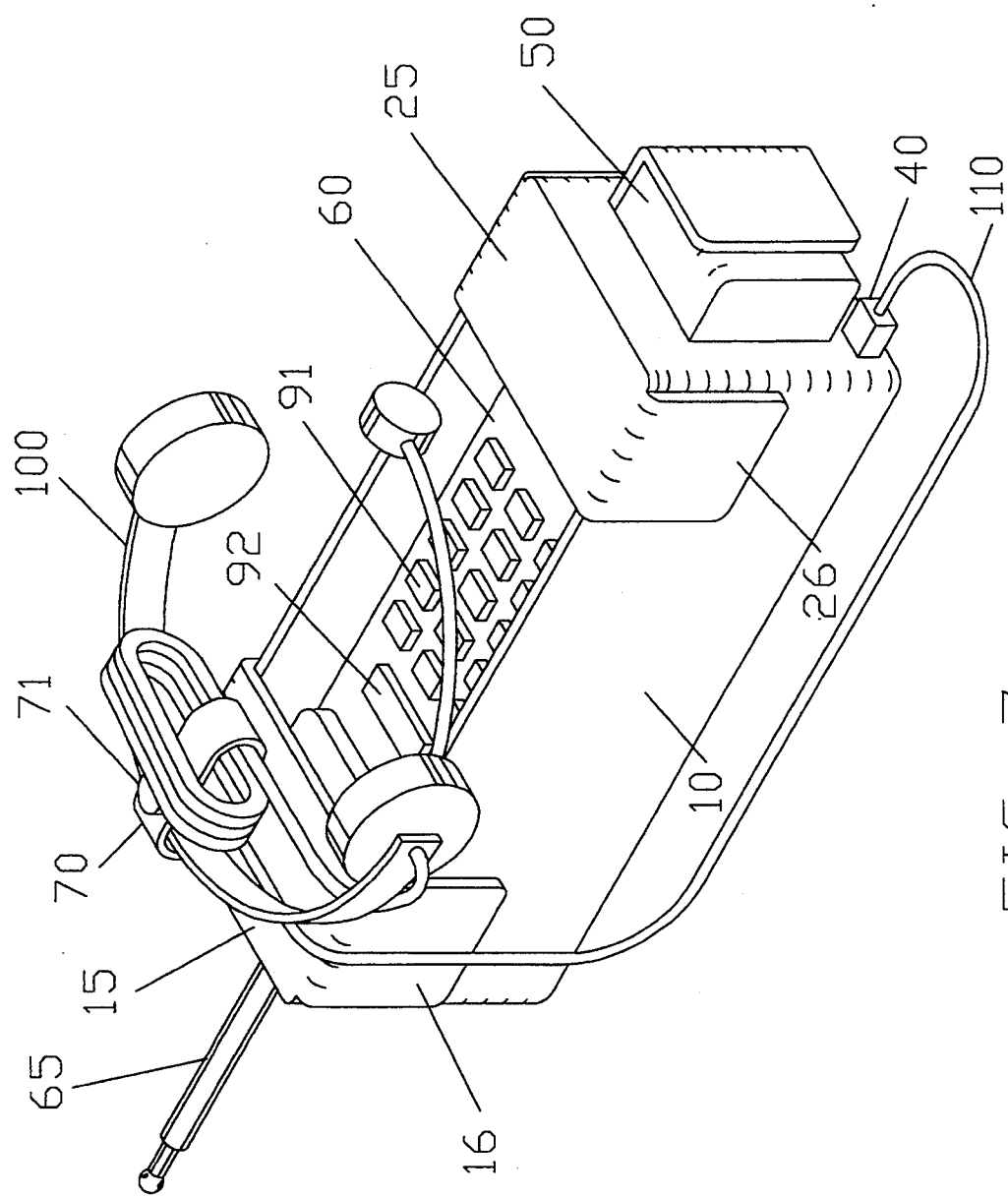
FIG. 7 is a perspective view of housing as shown in FIG. 6 with the addition of a telephone headset connected to the housing and in a stored position.

FIG. 7 is FIG. 6 with the additional feature showing the headset 100 and its cord 110 connected to the jack 40 and stored by means of the fabric loop 70 on the outside of the upper flap. Several feet of cord 110 are required to accommodate the headset for use with different sized users. The headset cord is ordinarily sold uncoiled but it is readily apparent that the cord could be tightly coiled. If the headset cord 110 was tightly coiled there would be no need for coiling the cord within the loop 70. In a headset with a coiled cord the loop would serve only to secure the headset itself to the outside of the housing. In addition if the housing and headset were sold as one unit it would be easy to permanently attach the headset cord to the housing and use a reel to retractably store the headset cord so it could be automatically extended and retracted to provide for convenient use of the headset.

FIG. 8 shows the invention mounted to the belt of a user with the headset and cord stored. It is apparent from this figure that the handset of the cordless phone, the housing and the headset and its attachments are all conveniently out of the way and would interfere very little, if any, with any activity being performed by the user. It is also apparent that the unit may be quickly and conveniently brought into operation by the user.

FIG. 9 is a different aspect of FIG. 8 with the headset now in use. The headset and its cord are attached to the housing by the cord by means of the jack located at the lower end of the housing. Both hands of the user are free. A desirable feature of the phone headset is that it can be used in a relatively noisy environment. Both the headset and housing are securely attached to the user so that the user could engage in vigorous physical activities, work activities or family activities while in use. The headset provides minimal interference with vision and with mobility of the head of the user. The invention allows the user to carry out most physical activities, chores and recreational activities even while carrying on a phone conversation.

What is claimed is:

1. An apparatus to permit hands free operation of a cordless phone, comprising:

a portable housing open on one side and of generally oblong shape and sized larger than a standard cordless phone handset;

a first flap attached at a first end of said portable housing and situated so as to be foldable to enclose a portion of said first end of the open side of said portable housing;

a receiver means contained within said first flap;

a second flap attached at a second end of said portable housing and situated so as to be foldable to enclose a portion of said second end of the open side of said portable housing;

a speaker means contained within said second flap;

a battery for providing electrical power for said receiver means and said speaker means;

means for wiring said receiver means, said speaker means and said battery whereby said receiver means, said speaker means and said power battery are detachably electrically connected to a telephone headset.

2. An apparatus to permit hands free operation of a cordless phone as recited in claim 1 wherein said portable housing, said first flap and said second flap include a first attachment means for removable attaching said first flap and said second flap to said portable housing when said first flap and said second flap are in a folded position.

3. An apparatus to permit hands free operation of a cordless phone as recited in claim 2 wherein said portable housing includes a second attachment means for securing said portable housing to a user.

4. An apparatus to permit hands free operation of a cordless phone as recited in claim 3 wherein said first flap includes left and right wings and said second flap includes left and right wings.

5. An apparatus to permit hands free operation of a cordless phone as recited in claim 4 wherein said first flap includes a third attachment means for detachably securing a telephone headset and its cord to said first flap.

6. An apparatus to permit hands free operation of a cordless phone as recited in claim 5 wherein said second attachment means is a belt loop attached to said portable housing.

7. An apparatus to permit hands free operation of a cordless phone as recited in claim 6 wherein at said second end of said portable housing is a battery case suitable for receiving said battery.

8. An apparatus to permit hands free operation of a cordless phone as recited in claim 7 wherein said first end of said portable housing has an antenna slot.

9. An apparatus to permit hands free operation of a cordless phone as recited in claim 3 wherein said second attachment means is a belt clip.

10. An apparatus to permit hand free operation of a cordless phone as recited in claim 3 wherein said first attachment means are miniature hooks and eyes so that said first flap left wing, said first flap right wing, said second flap left wing and said second flap right wing have miniature hooks on their respective inside surfaces and said portable housing has miniature eyes placed on a left and a right surface of said portable housing at said first end and at said second end of said portable housing.

11. An apparatus to permit hands free operation of a cordless phone comprising:

a portable housing open on one side and of generally oblong shape and sized larger than a standard cordless phone handset;

a first flap attached at a first end of said portable housing and situated so as to be foldable to enclose a portion of said first end of the open side of said portable housing;

a receiver means contained within said first flap;

a second flap attached at a second end of said portable housing and situated so as to be foldable to enclose a portion of said second end of the open side of said portable housing;

a speaker means contained within said second flap;

telephone headset means;

a battery for providing electrical power for said speaker means, said receiver means, and said telephone headset means;

means for wiring said speaker means, said receiver means, said telephone headset means, and said battery whereby said speaker means, said receiver means, said telephone headset means and said battery are electrically connected.

12. An apparatus to permit hands free operation of a cordless phone as recited in claim 11 wherein said portable housing includes a second attachment means for securing said portable housing to a user.

13. An apparatus to permit hands free operation of a cordless phone as recited in claim 12 wherein said first flap includes left and right wings and said second flap includes left and right wings.

14. An apparatus to permit hands free operation of a cordless phone as recited in claim 13 wherein said second attachment means is a belt loop attached to said portable housing.

15. An apparatus to permit hands free operation of a cordless phone as recited in claim 14 wherein at said second end of said portable housing is a battery case for receiving said battery.

16. An apparatus to permit hands free operation of a cordless phone as recited in claim 15 wherein said first end of said portable housing has an antenna slot.

* * * * *